United States Patent
Pullen et al.

(10) Patent No.: US 6,522,732 B1
(45) Date of Patent: Feb. 18, 2003

(54) SYSTEM AND METHOD OF PRESERVING STABLE CALLS DURING A SPLIT MODE OPERATION OF TELECOMMUNICATIONS EQUIPMENT

(75) Inventors: Mark W. Pullen, Plano, TX (US); Darrin L. Meek, Plano, TX (US); Lee E. Ballard, Austin, TX (US); Jerry L. Buchheit, Plano, TX (US); Shihlung Chiang, Farmers Branch, TX (US); Lorenzo E. Colunga, Farmers Branch, TX (US); Don K. Dill, Jr., Allen, TX (US); Chuck C. Fu, Plano, TX (US); Robert A. Landry, Plano, TX (US); William L. Long, Garland, TX (US); Viet N. Nguyen, Lewisville, TX (US); Kien T. Pham, Richardson, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/455,049

(22) Filed: Dec. 6, 1999

(51) Int. Cl.[7] .......................... H04M 15/00; H04M 7/00
(52) U.S. Cl. .............................. 379/112.02; 379/112.05; 379/112.1; 379/9.05; 379/221.03; 379/221.04; 370/216
(58) Field of Search ........................ 379/9, 9.05, 32.01, 379/112.01, 112.02, 112.03, 112.04, 112.05, 112.1, 221.03, 221.04; 370/216, 217, 219, 220

(56) References Cited

U.S. PATENT DOCUMENTS

| | | | | |
|---|---|---|---|---|
| 5,469,503 A | * | 11/1995 | Butensky et al. | 379/265 |
| 5,655,120 A | * | 8/1997 | Witte et al. | 395/675 |
| 5,661,719 A | * | 8/1997 | Townsend et al. | 370/216 |
| 5,664,090 A | * | 9/1997 | Seki et al. | 395/182.13 |
| 5,825,860 A | * | 10/1998 | Moharram | 379/133 |
| 5,848,128 A | * | 12/1998 | Frey | 379/9 |
| 5,883,939 A | * | 3/1999 | Friedman et al. | 379/9 |
| 5,974,114 A | * | 10/1999 | Blum et al. | 379/9 |
| 6,088,328 A | * | 7/2000 | McKnight | 370/216 |
| 6,188,695 B1 | * | 2/2001 | Przybysz | 370/410 |
| 6,205,557 B1 | * | 3/2001 | Chong et al. | 714/4 |
| 6,366,558 B1 | * | 4/2002 | Howes et al. | 370/219 |

* cited by examiner

Primary Examiner—Curtis Kuntz
Assistant Examiner—Quoc Tran
(74) Attorney, Agent, or Firm—Baker Botts, LLP; V. Lawrence Sewell; Craig A. Hoersten

(57) ABSTRACT

A computerized method of preserving stable calls during a split mode operation of telecommunications equipment includes the steps of sending a call block update message from a first side of the telecommunications equipment to a second side of the telecommunications equipment. The call block update message includes dynamic call state data on the stable call handled by the first side and stored in a call block file in the first side of the telecommunications equipment. The method includes sending a call block update acknowledgement message from the second side of the telecommunications equipment to the first side of the telecommunications equipment in response to receiving the call block update message. The above steps are repeated until all dynamic call state data in the call block file is duplicated and sent to the second side.

15 Claims, 5 Drawing Sheets

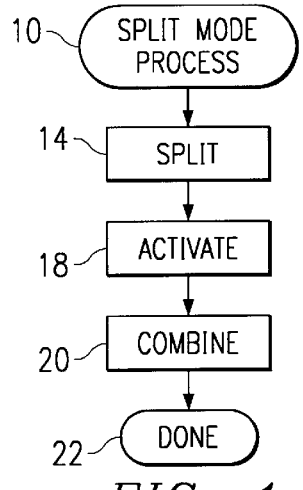
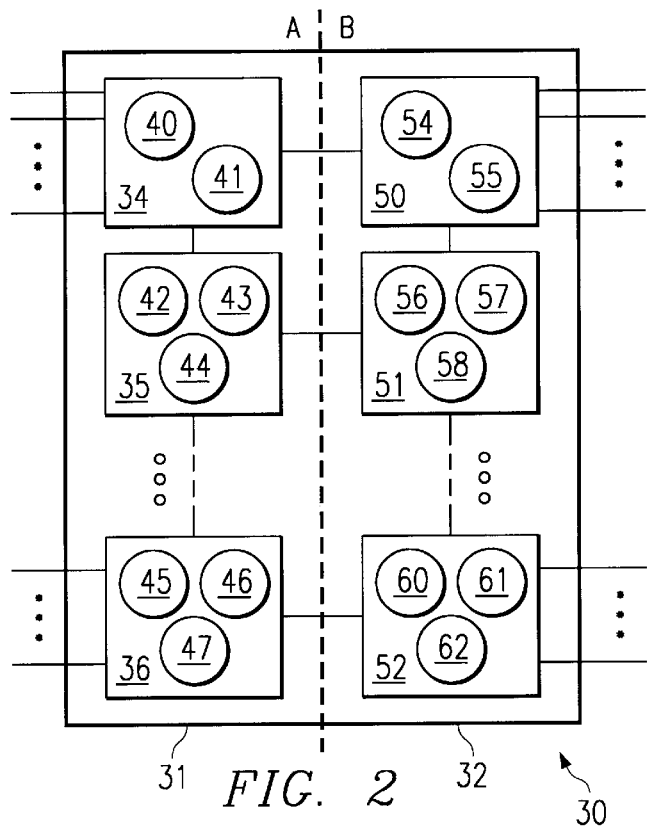
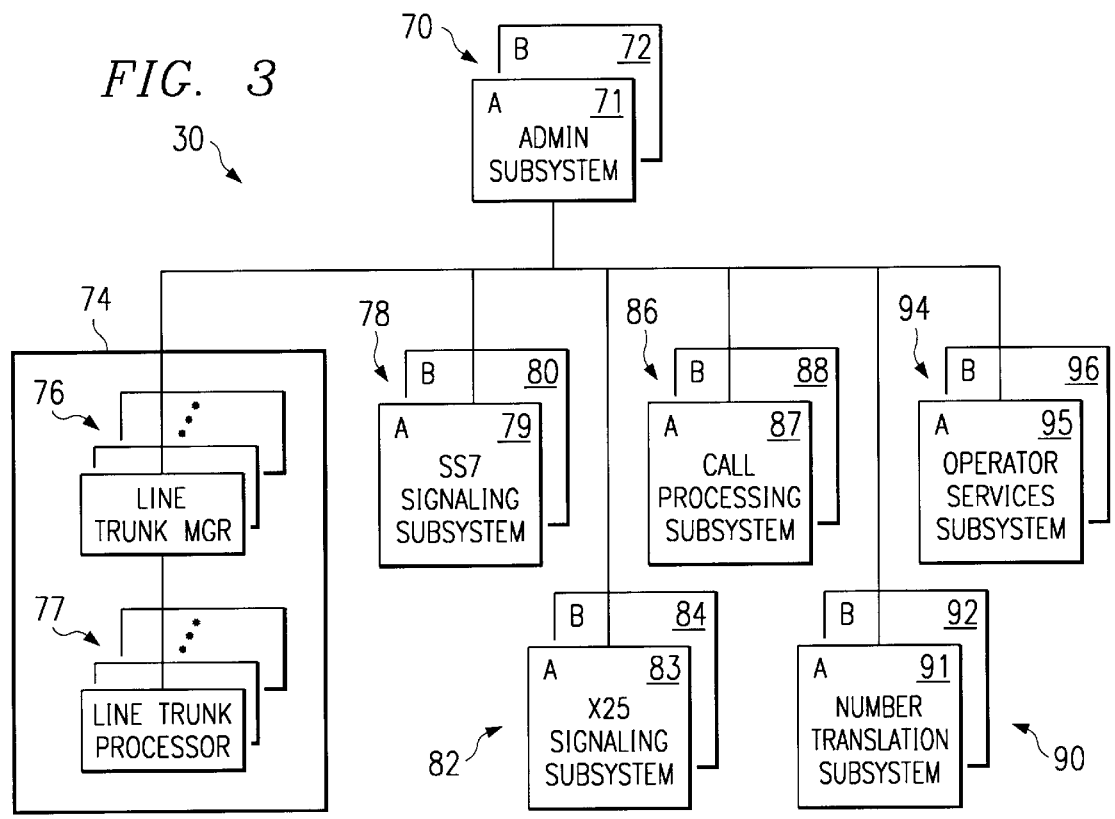

SYSTEM AND METHOD OF PRESERVING STABLE CALLS DURING A SPLIT MODE OPERATION OF TELECOMMUNICATIONS EQUIPMENT

RELATED PATENT APPLICATION

This application is related to co-pending U.S. application Ser. No. 09/455,290, entitled A System and Method of Automatically De-Activating Telecommunications Equipment Without Disconnecting Stable Calls, filed on Dec. 6, 1999, and co-pending U.S. application Ser. No. 09/455,291, entitled Method and System of Collecting and Reporting Statistical And Status Data In Telecommunications Equipment, filed on Dec. 6, 1999.

TECHNICAL FIELD OF THE INVENTION

This invention is related in general to the field of telecommunications equipment. More particularly, the invention is related to system and method of preserving stable calls during a split mode operation of telecommunications equipment.

BACKGROUND OF THE INVENTION

Telecommunications equipment are often constructed with redundancy so that failures do not produce catastrophic outages. These systems often have at least two identical and redundant planes. The redundant planes typically operate in an active-inactive mode. In active-inactive mode, the first plane is actively carrying telephone call traffic and the second plane is placed in a hot standby mode. In the hot standby mode, the second plane also carries live traffic but its operations are ignored. If the first plane fails or performs in a faulty manner for any reason, the second plane may be immediately switched from hot standby to active.

In 1996, DSC Communications Corporation (now Alcatel USA) of Plano, Tex., began using a split mode process to perform system hardware and/or software upgrade or maintenance to shorten the time the system is taken entirely off-line. Briefly, the split mode process splits the redundant system into two simplex systems, one becoming the active side and the second becoming the inactive side. During split mode, the active side carries the load of the entire system while the inactive side gets upgraded with new hardware and/or software. When such upgrade has been done, it is made the new active side and begins to carry call traffic. The old side becomes inactive. The old side is then combined into the new side so that both are running the new software load after the new side has been shown to operate satisfactorily. The combined sides then return to the previous operating mode, where one side is active and one is in hot standby. In this manner, system outage is significantly minimized.

Although split mode operation advantageously causes less call disruption because of shorted system down time, stable calls still become disconnected when the two sides swap the active-inactive operating status. In other words, the stable calls being handled by the active side at the time the active side becomes inactive and the inactive side becomes active are disconnected. This result is especially distressful when stable emergency calls are unwittingly disconnected.

SUMMARY OF THE INVENTION

Accordingly, there is a need for a system and method of preserving stable calls during product upgrade via a split mode operation for telecommunications equipment. In one aspect of the invention, a computerized method of preserving stable calls during a split mode operation of telecommunications equipment includes the steps of sending a call block update message, for each call block in the call block file, from a first side of the telecommunications equipment to a second side of the telecommunications equipment. The call block update message includes dynamic call state data on the stable call handled by the first side and stored in a call block in the first side of the telecommunications equipment. The method includes sending a call block update acknowledgement message from the second side of the telecommunications equipment to the first side of the telecommunications equipment in response to receiving the call block update message. The above steps are repeated until all dynamic call state data in the call block file is duplicated and sent to the second side.

In another aspect of the invention, a computerized method of preserving stable calls during a split mode operation of telecommunications equipment includes the steps of scanning a first call block file having dynamic call state data associated with the stable calls being processed by an active side of the telecommunications equipment, populating and sending call block update message with the dynamic call state data of the stable calls to an inactive side of the telecommunications equipment, sending call block update acknowledgement messages from the inactive side of the telecommunications equipment to the active side of the telecommunications equipment in response to receiving the call block update messages, and storing the dynamic call state data in the received call block update messages in a second call block file of the inactive side of the telecommunications equipment. The above steps are repeated until all dynamic call state data in the first call block file is duplicated in the second call block file.

In yet another aspect of the invention, telecommunications equipment is operable to execute a computerized method of preserving stable calls during a split mode operation of telecommunications equipment. The computerized method includes the steps of sending a call block update message from an active side of the telecommunications equipment to an inactive side of the telecommunications equipment, sending a call block update acknowledgement message from the inactive side of the telecommunications equipment to the active side of the telecommunications equipment in response to the call block update message, and repeating the above steps until all dynamic call state data in the call block file is duplicated and sent to the inactive side.

BRIEF DESCRIPTION OF THE DRAWINGS

For a better understanding of the present invention, reference may be made to the accompanying drawings, in which:

FIG. 1 is a simplified flowchart of an embodiment of a split mode process constructed according to an embodiment of the present invention;

FIG. 2 is a simplified block diagram of hardware and software systems undergoing a split operation according to an embodiment of the present invention;

FIG. 3 is a more detailed system block diagram of telecommunications equipment which undergoes a split operation according to an embodiment of the present invention;

DETAILED DESCRIPTION OF THE INVENTION

Figure 4:
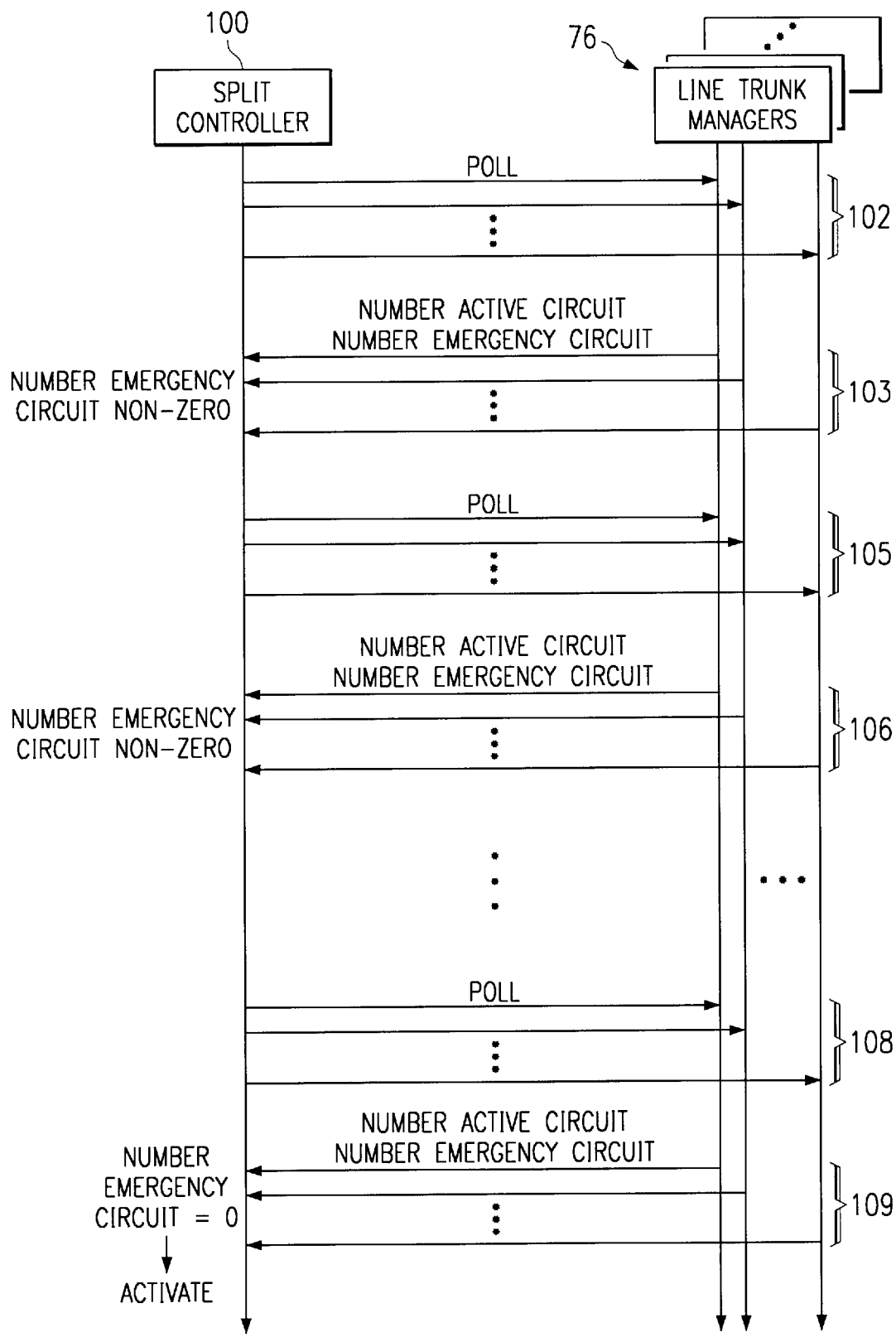
FIG. 4 is a message flow diagram of an embodiment of an auto-activation process according to an embodiment of the present invention.

FIG. 1 is a simplified flowchart of an embodiment of a split mode process 10 constructed according to an embodiment of the present invention. Briefly, split mode process 10 splits a system with redundancy into two simplex systems when hardware and/or software maintenance or upgrade is performed so that system outage is kept at a minimum. When the system is divided into two simplex systems, one simplex system becomes the active side and the second simplex system becomes the inactive side. During split mode, the active side carries the load of the entire system while the inactive side gets upgraded with new hardware and/or software. An exemplary application for split mode process 10 is telecommunications equipment, where it is important to minimize system down time.

In FIG. 1, in block 14, the telecommunications system is put in split mode, where redundancy in the system is divided into two simplex systems, one active and one inactive. The active side continues to carry traffic while the inactive side is worked on by the craft. After the new side has been updated, tested and ready to carry traffic, an activation process 18 is performed to cause the newly loaded side to run traffic and the old side to go idle. If the load is successful and there are no problems running traffic on the new side, the old side is combined, as shown in block 20, with the new side so that both sides are running the same new software load and the system returns to one with a redundant system.

FIG. 2 is a simplified block diagram of hardware and software systems used to illustrate the stages of the split mode process according to an embodiment of the present invention. Referring to FIG. 2, a system 30 has an A side 31 with duplicative B side 32. A side 31 includes a number of subsystems 34–36 on which a plurality of processes 40–47 are running. Similarly, B side 32 also has a number of subsystems 50–52 with a plurality of processes 54–62 executing thereon. A side 31 and B side 32 are interconnected and are able to communicate with one another prior to entering the split mode. As shown in the table below, prior to entering the split mode, the A and B sides are operating in a duplex mode where the B side is at standby for the A side.

|  | A Side | B Side |
| --- | --- | --- |
| Pre-Split | Active-Duplex | Standby-Duplex |
| Split | Active-Simplex | Inactive-Simplex |
| Activate | Inactive-Simplex | Active-Simplex |
| Combine | Active-Duplex | Standby-Duplex |

When the split command is given and the system enters the split mode, the A and B sides become independent simplex subsystems that no longer communicate with one another. A side 31 continues to operate in the active mode and handles the traffic load, but B side 32 no longer operates as a standby for A side 31. During this stage, craft personnel works on the B side to install a new software load and/or perform maintenance on the hardware. After the activate command is issued, the B side becomes the active side and the A side becomes inactive. During this stage, processors and devices are downgraded to an inactive state on the A side and upgraded to an active state on the B side. Just prior to the activate command, database data related to current stable calls on the A side are equalized or copied to the B side so that the stable call connections are preserved. After the activation phase has been completed, the B side running the new load is fully functional, although in a simplex mode. Thereafter, the combine operation brings over all remaining processors and devices to the new side so that the two sides return to the duplex or redundant system with one in active mode and the other in standby.

FIG. 3 is a more detailed system block diagram of telecommunications equipment 30 which may be commanded to undergo a split operation according to an embodiment of the present invention. Telecommunications equipment 30 is an example of a system which may be split during system maintenance and upgrade. The subsystems shown in FIG. 3 and described below are merely examples in such a system. Telecommunications equipment 30 may include an administration subsystem 70, which serves the primary administrator of system 30. It is generally responsible for command execution, configuration control, fault isolation control, automatic equipment test control, and on-line/off-line utility execution. Administration 70 further includes one or more processes that control the split mode process. It may be seen that administration subsystem 70 has two redundant planes running in the active-standby mode. Telecommunications equipment 30 may also include a line trunk subsystem 74, which may include several pairs of line trunk managers 76 supervising the operations of several pairs of line trunk processors 77, both having 1:1 or 1:N built-in redundancy. Telecommunications equipment 30 may also include an SS7 (Signaling System No. 7) signaling subsystem 78 having identical redundant planes 79 and 80. SS7 signaling subsystem 78 performs SS7 signaling link and message handling functions, message distribution functions and message routing functions. An X.25 signaling subsystem 82 also includes redundant A and B planes 83 and 84. X.25 signaling subsystem 82 is responsible for X.25 connections and communications functions. A call processing subsystem 86 also includes redundant A and B planes 87 and 88. Call processing subsystem 86 maintains the idle lists for the circuits, and the traffic metering and measurement data associated with the circuits. Call processing subsystem 86 also buffers the call detail records until they can be downloaded to disk. Further, call processing subsystem executes software processes necessary for call processing. Number translation subsystem 90 with A and B planes 91 and 92 is responsible for performing local number portability, global title translation, and other translation functions. Finally, an operator services subsystem 94 with A and B planes 95 and 96 is responsible for operator services support.

As seen from the foregoing, telecommunications equipment 30 includes a number of disparate subsystems that are under the general control of administration subsystem 70. Each subsystem as well as processors and processes in the subsystems have a redundant copy operating in active/active (load-sharing), active/standby, or active/hot standby modes.

In previous systems, stable calls as well as emergency calls handled by the active side are disconnected during the activate stage when it is switched over to the side with the new software or hardware. For the purpose of this disclosure, a stable call is defined as a call in which an answer has been received but a disconnect has not been received. In an embodiment of the present invention, stable calls including emergency calls are preserved during activation of the new side. In another embodiment of the present invention, only emergency calls are preserved. An emergency call is noted as such in a pre-translator index table or a 911 call and an equivalent thereof. FIG. 4 is a message flow diagram of an embodiment of an auto-activation process according to an embodiment of the present invention. The auto-activation process is initiated after the split has taken place and the inactive side has received hardware and/or software upgrades and is up and running with the new hardware and/or software. Once the craft personnel has verified the operation of the new inactive side, an auto-activate command may be issued. Upon receipt of the auto-activate command, a split controller 100 residing in administration subsystem 70 polls each in-service line trunk manager 76 (FIG. 3) in the active side for the number of active circuits and the number of circuits carrying emergency calls, as shown by polling messages 102. Each line trunk manager 76 returns this requested information to split controller 100, as shown by messages 103. The stable call count and stable emergency call count may be displayed on a craft terminal. This polling process is continued (as shown by messages 105) approximately every 30 seconds or another suitable period until a predetermined condition is met by the numbers returned by the line trunk managers. This predetermined condition may specify that no circuit should be in use when activate occurs, or it may specify that no circuit used for emergency calls should be in use when activate occurs. Therefore, split controller 100 studies the messages returned by the line trunk managers in response to each polling message (messages 108), until the returned count of active calls is zero or when the returned count of emergency calls is zero, as shown by messages 109. When the predetermined condition is met, split controller issues a activate command to initiate switching the new side active and the old side inactive.

With the auto-activate capability, the craft personnel no longer needs to painstakingly obtain and verify information on whether any stable calls or stable emergency calls are in place and to capture the time when this condition is met to begin the activate process. Because this task is essentially impracticable, the craft personnel typically does not attempt to accomplish this task, and as a result emergency calls may be unwittingly disconnected when the activate process is initiated. With the operation of the present auto-activate invention, the craft personnel can issue the auto-activate command and activation does not take place until the predetermined criteria are met. Therefore, no stable calls or stable emergency calls are disconnected as a result.

Figure 5:
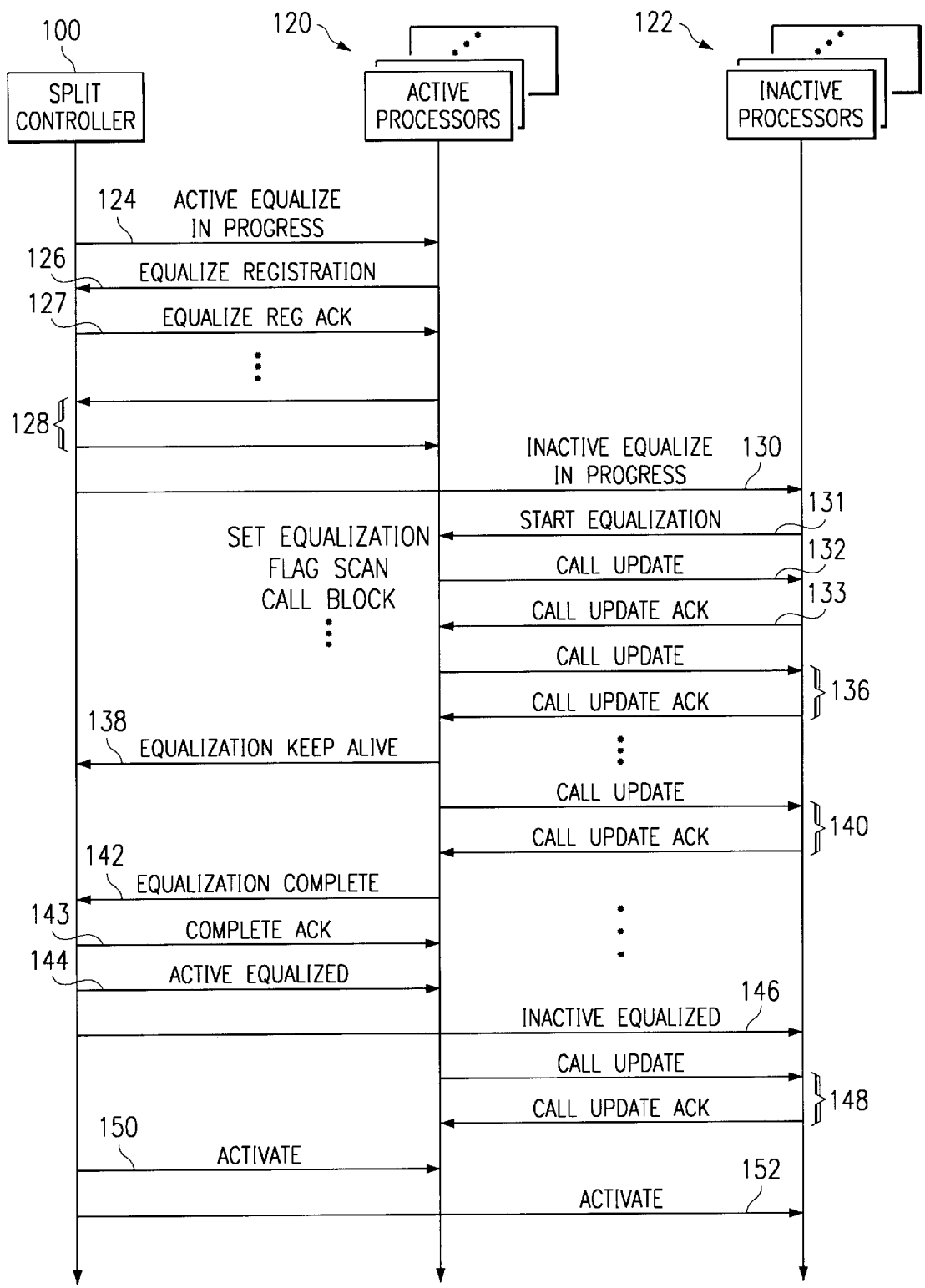
FIG. 5 is a message flow diagram of an embodiment of an automated call preservation process according to an embodiment of the present invention.

FIG. 5 is a message flow diagram of an embodiment of an automated call preservation process according to an embodiment of the present invention. As an alternative to the auto-activation process shown in FIG. 4, stable calls may be preserved by automated call preservation process of the present invention. Alternatively, the automated call preservation process may be used in conjunction with the auto-activation process. Automated call preservation process is executed prior to the activation stage, but after the inactive side is up and running with the new software and/or hardware. Referring to FIG. 5, at the request of craft personnel in the form of a command, split controller 100 sends a message 124 to processors 120 in the active side to set their respective states to active-equalize-in-progress. Split controller 100 then sends an inactive-equalize-in-progress message to inactive side 122 to set its state to the inactive-equalize-in-progress state. In response to entering the active-equalize-in-progress state, each task requiring equalization in the active side registers with split controller 100 (message 126) and receives an acknowledgement message 127 in response thereto. Upon receipt of the inactive-equalize-in-progress message, equalization tasks on inactive side 122 sends a start equalization message to active side 120 to indicate that it is ready for equalization.

Figure 6:
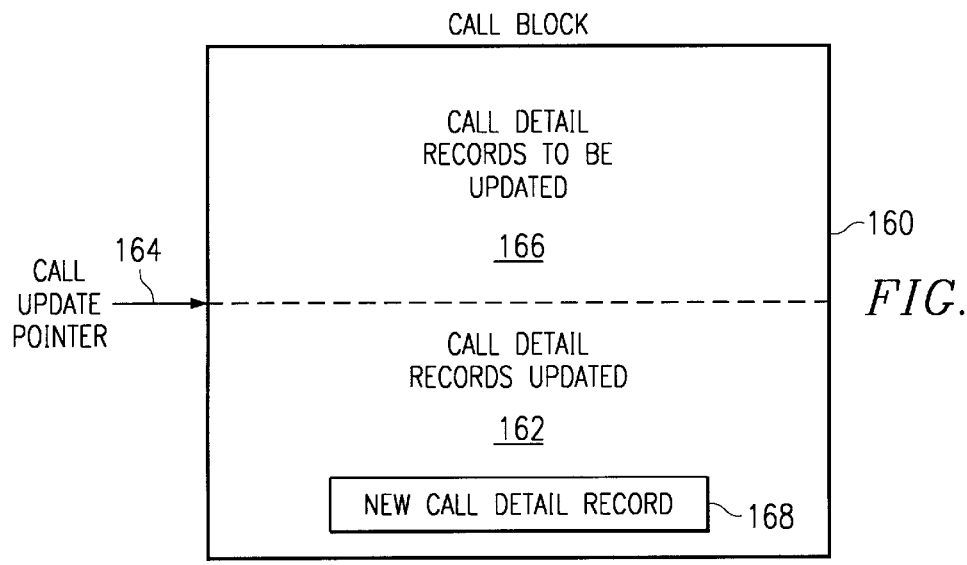
FIG. 6 is a diagram of a call block read and updated during the automated call preservation process of the present invention.

Equalization is a process by which critical databases, such as call detail records or call blocks stored in a call block file, are equalized so that stable telephone calls are preserved. Upon receipt of the start equalization message from inactive side 122, active side 120 sets an equalization flag and begins to scan call block file 160 shown in FIG. 6. Each call block in call block file 160 includes dynamic call state data for each stable call currently being serviced by active side 120. The call blocks are copied and supplied to inactive side 122 and stored in its call block file. A call update pointer 164 is used to scan call block file 160. On one side of call update pointer 164 are call blocks 162 that have already been copied to inactive side 122, on the other side of call update pointer 164 are call blocks 166 that have not yet been copied to inactive side 122. In response to receiving each call update message 132, a call update acknowledgement message 133 is sent back to active side 120. Call update continues with call update and call update acknowledgement messages 136 and 140 as call update pointer 154 traverses call block file 160. Periodically, active side 120 sends a heartbeat or equalization keep-alive message 138 to split controller 100 to inform it that equalization is still taking place. The keep alive message may be sent approximately every 60 seconds or over another suitable period.

As the equalization process proceeds, new call blocks for stable calls established since the beginning of equalization are stored in call block file 160. Those call blocks 168 which are stored in updated portion 162 of call block file 160 are immediately sent to inactive side 122 as they arise. Those call blocks which are stored in the to-be-updated portion 166 of call block file 160 are updated as call update pointer 164 reaches them in the normal equalization scan. When call update pointer 164 reaches the end of call block file and all call blocks have been updated to inactive side 122, active side 120 sends an equalization complete message 142 to split controller 100. Split controller 100 then sends an acknowledgement message 143 in response. Split controller 100 then sends a message 144 to active side 120 to set its state to active-equalized, and sends a message 146 to inactive side 122 to set its state to inactive-equalized. In the active-equalized state, active side 120 continues to update inactive side 122 with new call update messages of new call blocks, if any, with inactive side 122 acknowledging the update messages, as shown by messages 148. With the databases equalized, the system can enter the activate stage. Therefore, split controller 100 issues activate messages 150 and 152 to active side 120 and inactive side 122, to set their respective states to inactive and active, respectively. Active side 120 then becomes the inactive side and stops call processing, and inactive side 122 becomes the active side and begins call processing. If any exceptions arise during call block update, such as the acknowledgement messages become out of sync with the call update messages or missing acknowledgement messages, call update pointer may be reset to the beginning of the call block file to restart call update of the entire call block file. Although not specifically shown, split controller 100 may display status statements on the user interface to inform craft personnel of the progress of the equalization process.

Operating in this manner, stable calls are preserved by sending an image of the call block containing dynamic call state for each call from the active side to the inactive side prior to bringing the inactive side up running the new software load. Once the call block is equalized, the active side still running the old software load can be taken down and the inactive side with the new software load can be brought up processing the same call traffic. Therefore, telephone service subscribers no longer experience unexpected call disconnection and telephone service providers are no longer required to wait for the short time periods during the night when there is minimal call traffic.

In the same or similar manner, matrix connection databases may be equalized to preserve the path or connection in a switch matrix from the active side to the inactive side. In alternative embodiments, existing matrix connection recovery logic may be used to equalize the two sides.

Figure 7:
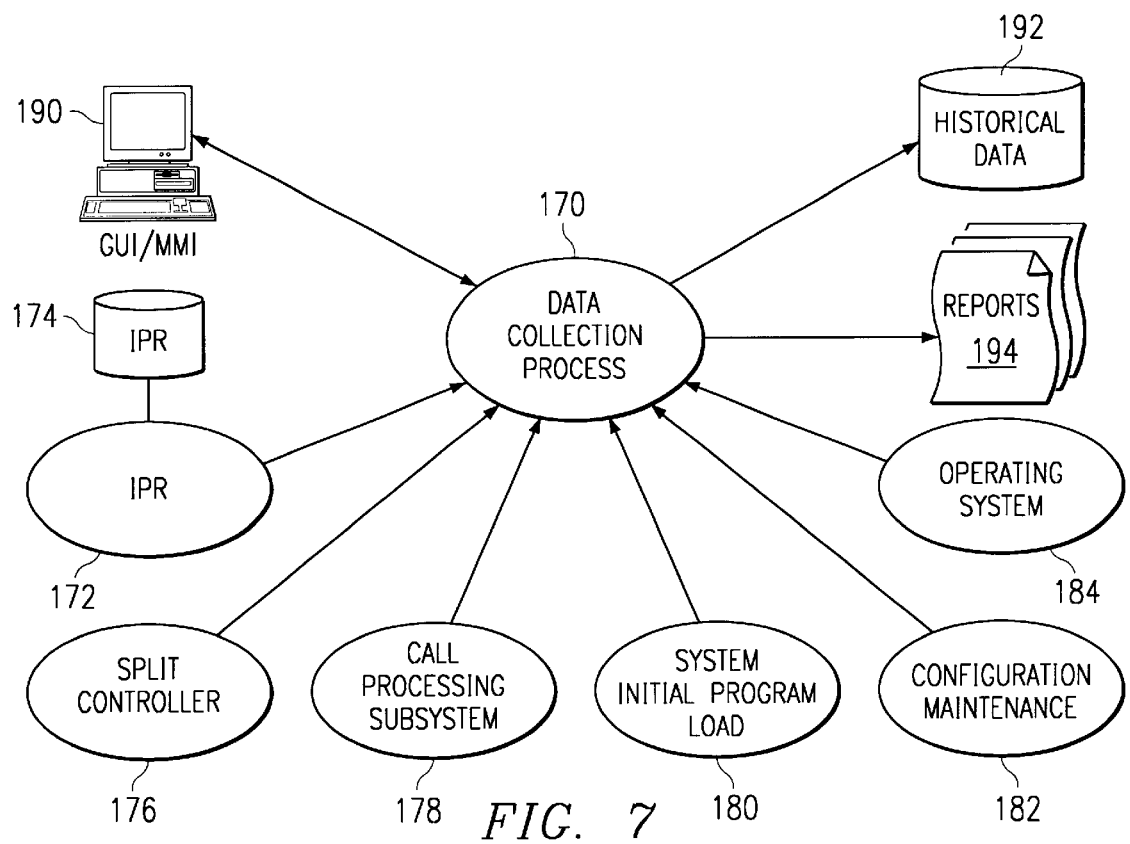
FIG. 7 is a block diagram of an embodiment of a data collection process according to the teachings of the present invention.

FIG. 7 is a block diagram of an embodiment of a data collection process 170 according to the teachings of the present invention. Data collection process 170 may be started at the beginning of split mode process 10 prior to the issuance of the split command, or at any point in split mode process 10 to obtain statistical and status data needed by craft personnel to make certain operational decisions or for system monitoring purposes. Previously, the gathering of system outage time and other performance parameters during split mode process 10 are manual, labor-intensive, and subject to human error and inconsistency. Manually, the craft personnel must access and read data from the information problem report (IPR) database, the automated message accounting database (AMA), and determining switch configuration through several man-machine interfaces. Often, the craft is required to use a stopwatch to time events while watching data displayed on a user interface.

Referring to FIG. 7, data collection process 170 interfaces and gathers data from several subsystems, including an information problem report subsystem 172 and its database 174. In an embodiment of the present invention, data collection process 170 resides on administration subsystem 70. All information and problem reports that are issued during the various stages of split mode process 10 are collected by data collection process 170, sorted by the phase of the split mode and processed for streamlined and condensed summary reporting to the craft as described below. Data may also be stored in a historical data database 192 and also printed in report form 194. The number of information and problem reports issued during each stage of split mode process 10 is collected, stored, and displayed or printed at craft request. The number of each type of information problem report issued during each stage of split mode process 10 is collected, stored, displayed and/or printed. In addition, data collection process 170 parses selected information and problem reports for crash and duplex outage information, including time stamps and the affected processor.

Data collection process 170 also collects data from split controller 176 and a system initial program load process 180. System initial program load process 180 is a process that brings the whole system with new software or hardware up and running. Data gathered from split controller 176 and system initial program load process 180 include start time, completion time and total time duration of each stage in split mode process 10 as well as the start time, completion time and total time duration of the process itself. Other data of interest generated by or readily accessible by split controller 176 and system initial program load process 180 may also be collected made available to the craft personnel.

Call processing subsystem 178 is also a source of data gathered by data collection process 170. The data collected, stored, displayed and/or printed include the stable call disconnects and emergency call disconnects. System processors and processes that may be grouped into configuration and maintenance functionality are also a source of data needed by the craft. The data collected from this group may include switch configuration, old side software load, new side software load, number of processors equipped, total processor boot duration, total processor restore duration, total processor outage duration, average processor boot duration, average processor restore duration, average processor outage duration, number of processors requiring multiple boots, number of processors requiring multiple restores, and number of duplex outages.

Operating system 184 also provides data to data collection process 170, such as the number of processor crashes, crashed processor identifiers, time stamps of crashes, and the like. Operating system 184 logs OPSYS 5 information and problem reports with crash information for each processor crash on the system. The crash data are then gathered and reported in the information and problem report processing.

Configuration and maintenance subsystem 182 obtains processor boot and restore data and updates, a processor status table (not shown) real time. Data collection process 170 monitors this status table to obtain the data. Configuration and maintenance subsystem 182 also stores system static information to an administration database (not shown) which is read directly by data collection process 170.

Figure 8:
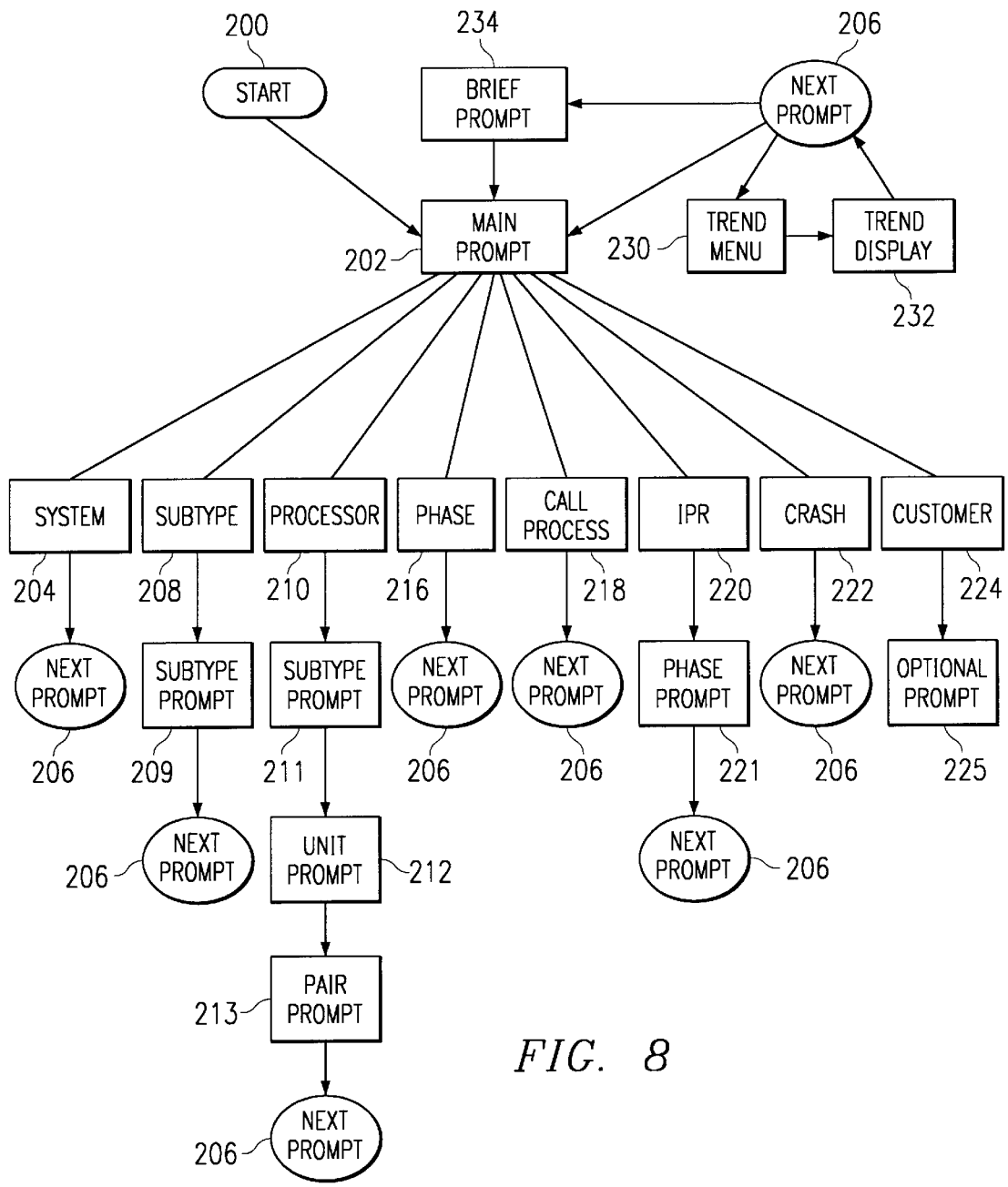
FIG. 8 is a block diagram of a user interface process of the data collection process constructed according an embodiment of the present invention.

FIG. 8 is a block diagram of a user interface process 190 of data collection display process 170 constructed according an embodiment of the present invention. User interface process 190 may be a man-machine interface or a graphical user interface. The menu and prompt flow of user interface process 190 is shown in FIG. 8. At start up (block 200), a main menu 202 is displayed. Main menu 202 provides a selection of a number of report options, such as system 204, subtype 208, processor 210, phase 216, call process 218, IPR 220, crash 222, and custom 224. Reports of various types are displayed when the user or craft selects an option. For some selections, such as subtype 208, processor 210, IPR 220 and custom 224, sub-menus (subtype prompt 209, subtype prompt 211, unit prompt 212, pair prompt 213, phase prompt 221, and option prompt 225) are provided to narrow down the types of data to be displayed or printed. From main prompt 202, a brief menu or prompt 234 may be selected that displays an abbreviated subset of the available historical reports. Further, a trend menu 230, which can be used to display trend reports 232, can also be selected for any data report type. It may be seen that for some data report types, the data are collected from more than one source shown in FIG. 7. Operating in this manner, data collection process 170 is operable to gather data from many different subsystems in the systems, and reorganize and present the data to the craft in a logical and informative way according to the suggested grouping shown in FIG. 8. Therefore, the craft can obtain the needed data from working with one user interface.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A computerized method of preserving stable calls during a split mode operation of telecommunications equipment, comprising:

sending, for each call block, a call block update message from a first side of the telecommunications equipment to a second side of the telecommunications equipment, the call block update message including dynamic call state data on the stable call handled by the first side and stored in a call block file in the first side of the telecommunications equipment sending a call block update acknowledgement message from the second side of the telecommunications equipment to the first side of the telecommunications equipment in response to the call block update message;

repeating the above steps until all dynamic call state data in the call block file is duplicated and sent to the second side;

scanning the call block file of the first side and reading the dynamic call state data for each stable call;

populating the call block update message with the dynamic call state data; and sending the call block update message to the second side;

setting an equalization flag;

scanning the call block file of the first side using a call update pointer, the call update pointer dividing the call block file into an updated portion and a non-updated portion;

reading new dynamic call state data stored into the updated portion of the call block file in response to the set equalization flag;

populating the call block update message with the newly stored dynamic call state data; and sending the call block update message to the second side of the telecommunications equipment.

2. The computerize, method, as set forth in claim 1, further comprising periodically sending an equalization keep-alive progress message from the first side to a split controller controlling the split mode operation, the equalization keep-alive progress message indicative of on-going call block file update.

3. The computerized method, as set forth in claim 1, further comprising:

setting an operating state of the first side to active equalize in progress;

setting an operating state of the second side to inactive equalize in progress; and sending a start equalization message from the second side to the first side indicative of the second side's readiness to equalize the call block file.

4. The computerized method, as set forth in claim 1, further comprising sending an equalization complete message from the first side to a split controller controlling the split mode control operation indicative of completion of equalization of the call block file.

5. The computerized method, as set forth in claim 4, further comprising automatically setting the first side to an inactive operating state and the second side to an active operating state in response to receiving the equalization complete message by the split controller.

6. A computerized method of preserving stable calls during a split mode operation of telecommunications equipment, comprising:

scanning a first call block file having dynamic call state data associated with the stable calls being processed by an active side of the telecommunications equipment;

populating and sending a call block update message with the dynamic call state data of a stable call to an inactive side of the telecommunications equipment;

sending a call block update acknowledgment message from the inactive side of the telecommunications equipment to the active side of the telecommunications equipment in response to receiving the call block update message;

storing the dynamic call state data in the received call block update message in a second call block file of the inactive side of the telecommunications equipment;

repeating the above steps until all dynamic call state data in the first call block file is duplicated in the second call block file;

setting an operating state of the active side to active equalize in progress;

setting an operating state of the inactive side to inactive equalize in progress; and sending a start equalization message from the inactive side to the active side indicative of the inactive side's readiness to equalize the first and second call block file;

setting an equalization flag;

scanning the first call block file of the active side using a call update pointer, the call update pointer dividing the first call block into an updated portion and a non-updated portion;

reading new dynamic call data stored into the updated portion of the first call block file in response to the set equalization flag;

populating the call block update message with the newly stored dynamic call state information; and sending the call block update message to the inactive side.

7. The computerized method, as set forth in claim 6, further comprising periodically sending an equalization keep-alive progress message from the active side to a split controller controlling the split mode operation, the equalization keep-alive progress message indicative of on-going call block file update.

8. The computerized method, as set forth in claim 6, further comprising sending an equalization complete message from the active side to a split controller controlling the split mode control operation indicative of completion of equalization of the call block file.

9. The computerized method, as set forth in claim 8, further comprising automatically setting the active side to an inactive operating state and the inactive side to an active operating state in response to receiving the equalization complete message by the split controller.

10. A computer-readable medium storing the steps set forth in claim 6.

11. Telecommunications equipment operable to execute a computerized method of preserving stable calls during a split mode operation of telecommunications equipment, the computerized method comprising:

sending, for each call block, a call block update message from an active side of the telecommunications equipment to an inactive side of the telecommunications equipment, the call block update message including dynamic call state data on the stable call handled by the active side and stored in a call block file in the active side of the telecommunications equipment;

sending a call block update acknowledgement message from the inactive side of the telecommunications equipment to the active side of the telecommunications equipment in response to the call block update message;

repeating the above steps until all dynamic call state data in the call block file is duplicated and sent to the inactive side;

scanning the call block file of the active side and reading the dynamic call state data for each stable call;

populating the call block update message with the dynamic call state data; and sending the call block update message to the inactive side;

setting an equalization flag;

scanning the call block file of the active side using a call update pointer, the call update pointer dividing the call block file into an updated portion and a non-updated portion;

reading new dynamic call state data stored into the updated portion of the call block file in response to the set equalization flag;

populating the call block update message with the newly stored dynamic call state data; and sending the call block update message to the inactive side of the telecommunications equipment.

12. The computerized method, as set forth in claim 11, further comprising periodically sending an equalization keep-alive progress message from the active side to a split controller controlling the split mode operation, the equalization keep-alive progress message indicative of on-going call block rile update.

13. The computerized method, as set forth in claim 11, further comprising:

setting an operating state of the active side to active equalize in progress;

setting an operating state of the inactive side to inactive equalize in progress; and sending a start equalization message from the inactive side to the active side indicative of the inactive side's readiness to equalize the call block files.

14. The computerized method, as set forth in claim 11, further comprising comprising sending an equalization complete message from the active side to a split controller controlling the split mode control operation indicative of completion of equalization of the call block file.

15. The computerized method, as set forth in claim 14, further comprising automatically setting the active side to an inactive operating state and the inactive side to an active operating state in response to receiving the equalization complete message by the split controller.

* * * * *